US012732440B2

(12) United States Patent
Emmons et al.

(10) Patent No.: US 12,732,440 B2
(45) Date of Patent: Sep. 8, 2026

(54) OBSERVING NETWORK BEHAVIOR USING CHARACTERISTICS OF NETWORK PROTOCOLS

(71) Applicant: Arista Networks, Inc., Santa Clara, CA (US)

(72) Inventors: Thomas Benjamin Emmons, Sunnyvale, CA (US); Hugh Weber Holbrook, Palo Alto, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 26 days.

(21) Appl. No.: 18/759,013

(22) Filed: Jun. 28, 2024

(65) Prior Publication Data

US 2025/0323847 A1 Oct. 16, 2025

Related U.S. Application Data

(60) Provisional application No. 63/634,207, filed on Apr. 15, 2024.

(51) Int. Cl.

| | |
|---|---|
| ***H04L 43/026*** | (2022.01) |
| ***G06F 15/173*** | (2006.01) |
| ***H04L 41/16*** | (2022.01) |
| *H04L 43/0852* | (2022.01) |

(52) U.S. Cl.

CPC ...... *H04L 43/026* (2013.01); *G06F 15/17331* (2013.01); *H04L 41/16* (2013.01); *H04L 43/0852* (2013.01)

(58) Field of Classification Search

None

See application file for complete search history.

(56) References Cited

U.S. PATENT DOCUMENTS

| | | | | |
|---|---|---|---|---|
| 9,191,290 | B2 * | 11/2015 | Ding | H04L 43/062 |
| 9,658,782 | B2 * | 5/2017 | Romem | G06F 3/0652 |
| 10,509,764 | B1 * | 12/2019 | Izenberg | H04L 67/1097 |
| 10,728,109 | B1 * | 7/2020 | Hu | H04L 41/0894 |
| 11,620,254 | B2 * | 4/2023 | Miller | G06F 9/45558 709/212 |
| 12,531,806 | B2 * | 1/2026 | Goyal | H04L 47/122 |
| 2017/0171075 | A1 * | 6/2017 | Sajeepa | H04L 69/324 |
| 2017/0187629 | A1 * | 6/2017 | Shalev | H04L 69/10 |
| 2019/0361743 | A1 * | 11/2019 | Magro | G06F 9/546 |
| 2020/0104275 | A1 * | 4/2020 | Sen | G06F 9/544 |
| 2022/0232074 | A1 * | 7/2022 | Scaglione | H04L 67/1097 |
| 2023/0064845 | A1 * | 3/2023 | Srinivasan | H04L 41/0894 |

(Continued)

OTHER PUBLICATIONS

European Patent Office, Extended European Search Report, Ep App. No. 25170322.9, dated Aug. 26, 2025, 8 pgs.

(Continued)

*Primary Examiner* — Jason D Cardone

(74) *Attorney, Agent, or Firm* — Fountainhead Law Group, PC

(57) ABSTRACT

Network monitoring systems and methods that utilize packet characteristics to perform network monitoring by capturing a limited subset of packets are disclosed. These captured packets can be correlated to monitor flows within the network and determine performance characteristics of the applications or the network with respect to those flows using the captured packets.

21 Claims, 6 Drawing Sheets

(56) References Cited

U.S. PATENT DOCUMENTS

| | | | | |
|---|---|---|---|---|
| 2023/0239244 | A1* | 7/2023 | Tian | H04L 47/2483 709/224 |
| 2023/0269148 | A1* | 8/2023 | Foo | G06F 16/2255 709/224 |
| 2023/0336490 | A1* | 10/2023 | Arslan | H04L 47/283 |
| 2023/0421463 | A1* | 12/2023 | Hatta | H04L 43/028 |
| 2024/0220347 | A1* | 7/2024 | Han | H04L 67/146 |
| 2024/0275700 | A1* | 8/2024 | Hatta | H04L 43/12 |
| 2025/0184260 | A1* | 6/2025 | Yin | H04L 12/4633 |

OTHER PUBLICATIONS

Liu Yao et al: "Scalable Fully Pipelined Hardware Architecture for In-Network Aggregated AllReduce Communication", IEEE Transactions on Circuits and Systems I: Regular Papers, IEEE, US, vol. 68, No. 10, Jul. 29, 2021 (Jul. 29, 2021), pp. 4194-4206, XP011880269, ISSN: 1549-8328, DOI: 10.1109/TCSI.2021.3098841 [retrieved on Sep. 27, 2021].

Talpey Microsoft T Hurson Intel G Agarwal Marvell T Reu Chelsio T: "RDMA Extensions for Enhanced Memory Placement; draft-talpey-rdma-commit-01.txt", RDMA Extensions for Enhanced Memory Placement; Draft-Talpeyrdma-Commit-01.TXT; Internet-Draft: NFSV4 (Provisionally), Internet Engineering Task Force, IETF; Standardworkingdraft, Internet.

* cited by examiner

FIG. 2

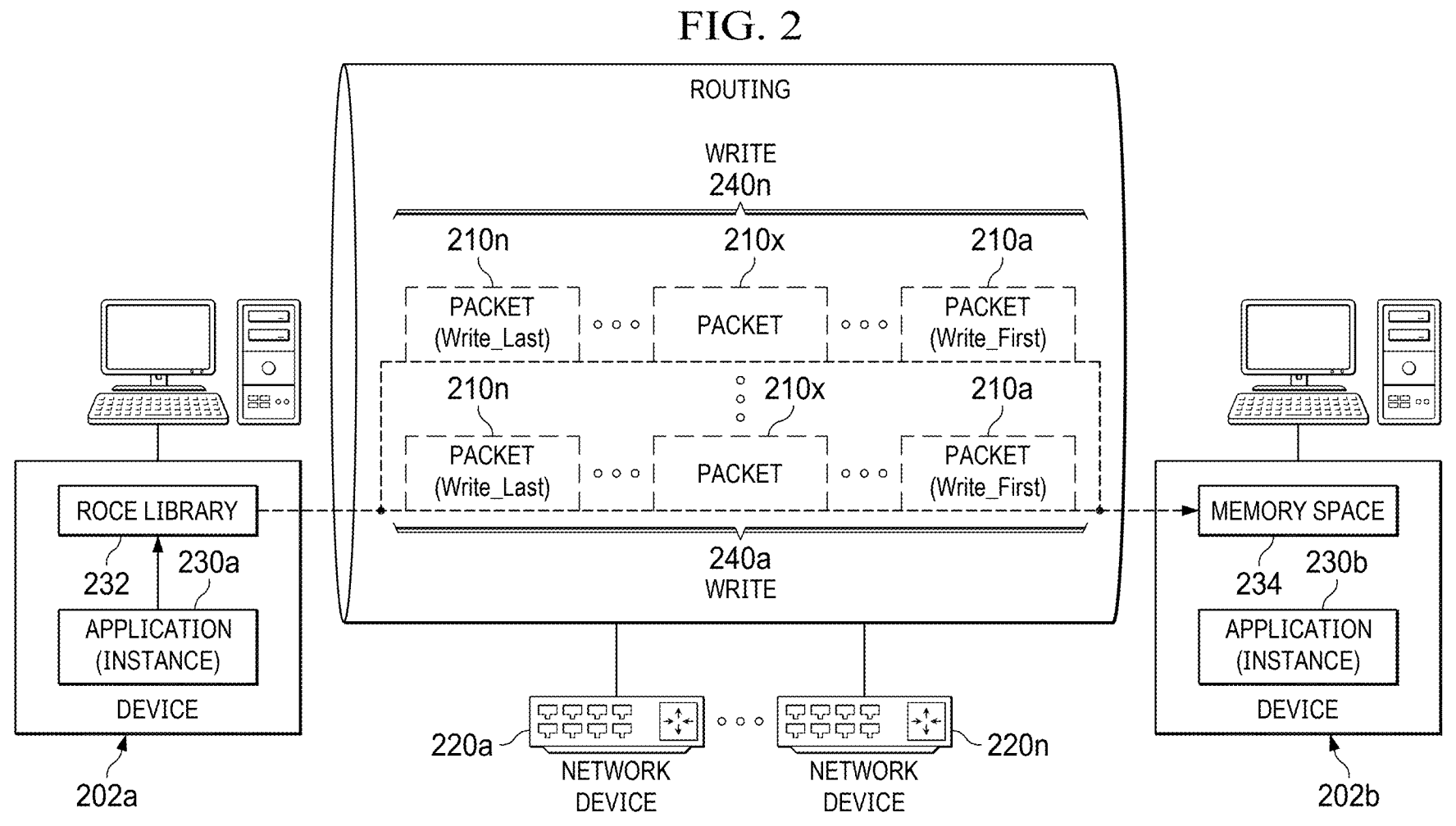

ROUTING

WRITE 240n

WRITE 240a

PACKET (Write_Last) 210n

PACKET 210x

PACKET (Write_First) 210a

DEVICE 202a

ROCE LIBRARY 232

APPLICATION (INSTANCE) 230a

DEVICE 202b

MEMORY SPACE 234

APPLICATION (INSTANCE) 230b

NETWORK DEVICE 220a

NETWORK DEVICE 220n

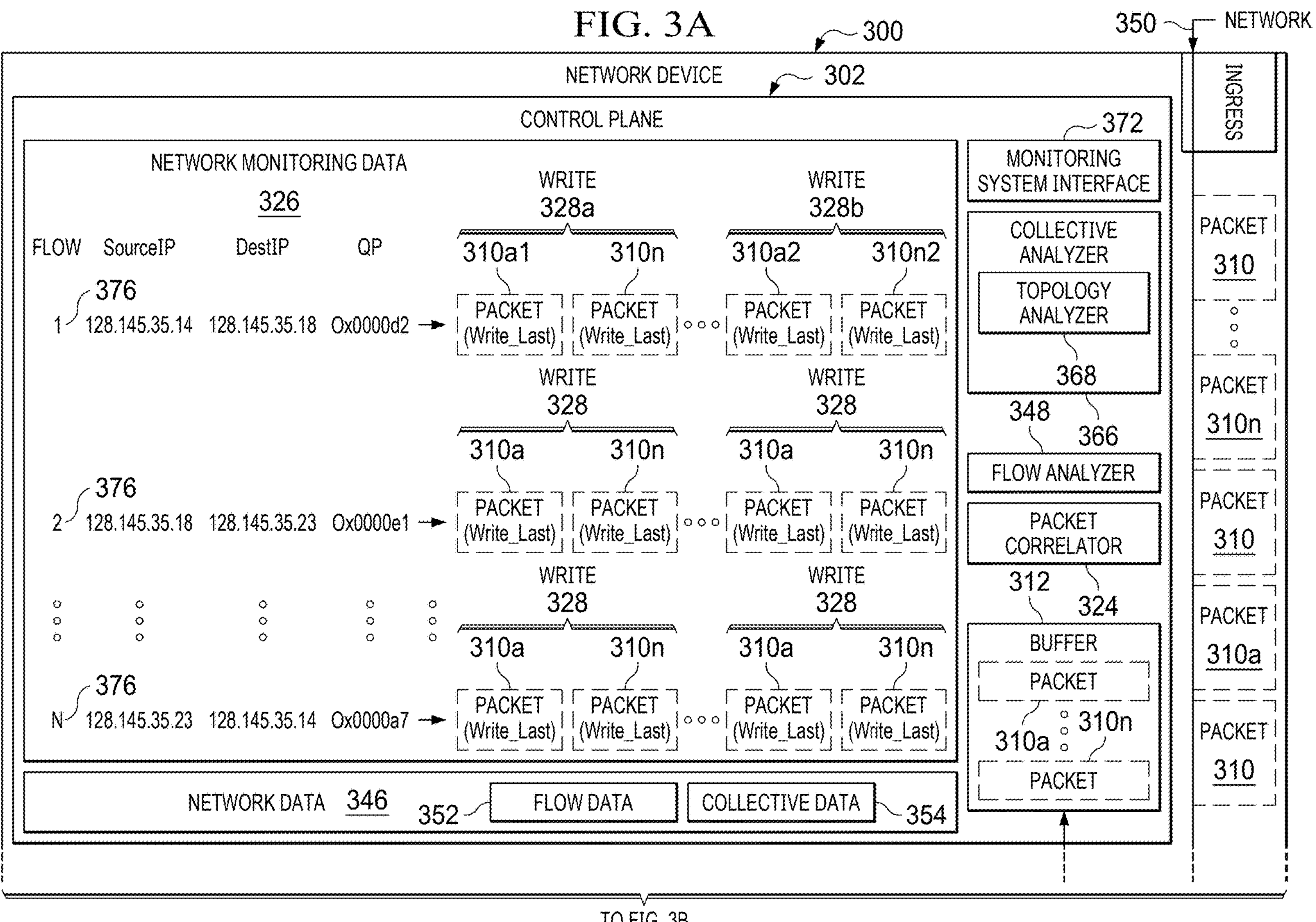
FIG. 3A
300
350
NETWORK
NETWORK DEVICE
302
CONTROL PLANE
INGRESS
NETWORK MONITORING DATA
326
FLOW
SourceIP
DestIP
QP
WRITE
328a
WRITE
328b
310a1
310n
310a2
310n2
376
1
128.145.35.14
128.145.35.18
Ox0000d2
PACKET (Write_Last)
WRITE
328
310a
310n
376
2
128.145.35.18
128.145.35.23
Ox0000e1
376
N
128.145.35.23
128.145.35.14
Ox0000a7
372
MONITORING SYSTEM INTERFACE
COLLECTIVE ANALYZER
TOPOLOGY ANALYZER
368
348
366
FLOW ANALYZER
PACKET CORRELATOR
312
324
BUFFER
PACKET
310a
310n
PACKET
PACKET 310
PACKET 310n
PACKET 310
PACKET 310a
PACKET 310
NETWORK DATA 346
352
FLOW DATA
COLLECTIVE DATA
354
TO FIG. 3B

OBSERVING NETWORK BEHAVIOR USING CHARACTERISTICS OF NETWORK PROTOCOLS

RELATED APPLICATION(S)

This patent application claims the benefit of priority under 35 U.S.C. 119 to U.S. Provisional Patent Application Ser. No. 63/634,207, filed Apr. 15, 2024, entitled "Observing Network Behavior Using Characteristics of Network Protocols" by inventors Emmons and Holbrook, which is incorporated herein in its entirety by reference for all purposes.

BACKGROUND

Computing applications are increasingly implemented in distributed computing systems. These distributed computing systems comprise one or more software components that execute on multiple computing devices or processors connected over a network. Consequently, these distributed computing systems may involve the transfer (e.g., communication) of large amounts of data between these computing systems over the network.

The implementation of modern artificial intelligence (AI) and the associated training of machine learning models used to implement these AI systems is a microcosm of these general trends. Most training of machine learning models utilized for these AI systems is currently accomplished using distributed computing systems and involves the communication of large amounts of data between the computing devices in these distributed computing systems.

As such, the processes involved in machine learning training, or other types of applications utilizing processes executing on distributed computing systems, may utilize network protocols designed to facilitate the rapid or reliable transfer of data over networks. One such network protocol is Remote Direct Memory Access (RDMA) over Converged Ethernet (ROCE). RDMA is a remote memory management capability that allows data movement (e.g., process to process) directly between memory with little to no CPU involvement.

For a variety of reasons, it may be desirable to observe characteristics of the data transfers or network usage in conjunction with the execution of these types of applications on distributed computing systems. These reasons may include, for example, determining if an application is performant, and if not, where the impediments to such performance are arising. Tracking the network performance or data transfers in these distributed computing systems is, however, difficult. For example, it may be unworkable to sample a large number of packets to detect network problems, as the amount of sampling required may not be possible at wire speeds, or may itself severely degrade performance of the very network under observation.

It is thus desirable to provide improved network monitoring mechanisms in networked environments that utilize particular network protocols, including ROCE.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 2 is a block diagram of an embodiment of a network monitoring system.

FIGS. 3A and 3B (collectively FIG. 3) is a more detailed block diagram of an embodiment of a network monitoring system.

DETAILED DESCRIPTION

Figure 1:
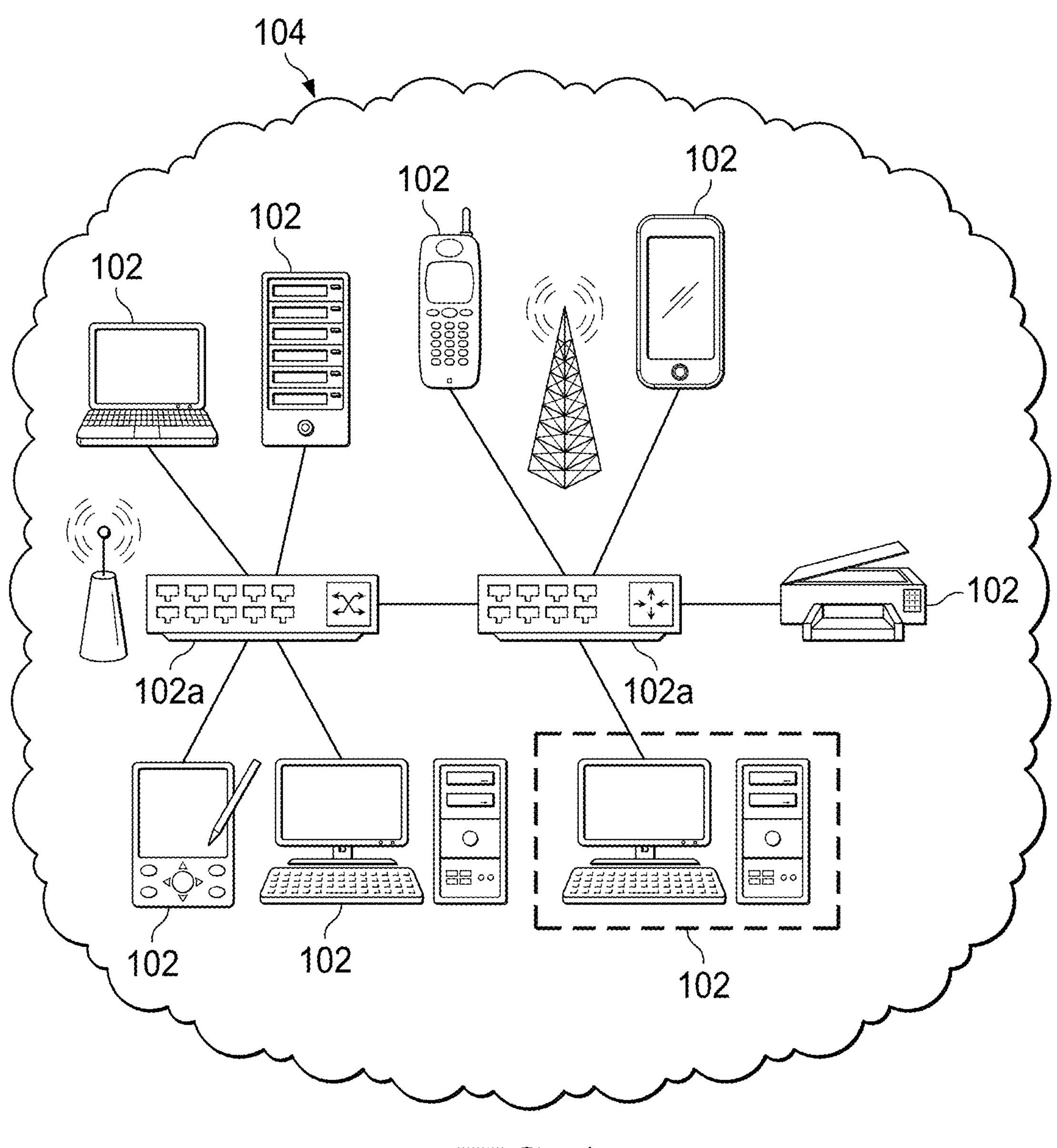
FIG. 1 is a block diagram depicting a general architecture of a network including one embodiment of a network monitoring system.

As discussed, because of the increasing demand on computing resources placed by current computing applications, and the amount of data utilized in such applications, such computing applications are increasingly implemented in distributed computing systems. These distributed computing systems comprise one or more software components that execute on multiple computing devices or processors connected over a network. Consequently, these distributed computing systems may involve the transfer (e.g., communication) of large amounts of data between these computing systems over the network. Thus, commensurate with the increased use of these distributed computing systems, specialized network protocols for the transfer of data have also been developed.

The implementation of modern artificial intelligence (AI) and the associated training of machine learning models used to implement these AI systems is a microcosm of these general trends. In particular, as the size of machine learning models (e.g., the number of parameters of such models), and associated datasets involved in training those machine learning models, increases it is almost completely impractical for such models to be trained on a single computing device. Thus, almost all training of machine learning models utilized for these AI systems is currently accomplished using distributed computing systems and involves the communication of large amounts of data between the computing devices in these distributed computing systems.

To illustrate in more detail, historically as the size of the machine learning models and datasets increased, the use of Graphics Processing Units (GPUs) became the de facto standard for training these models for a number of reasons, including for example, the use of multiple cores that may be efficient in performing certain types of operations in these GPUs. However, as the sizes of models and datasets became ever greater, the use of a single GPU to train these models became untenable. The training of a sufficiently large machine learning model on modern datasets may take tens, or hundreds, of days on a single GPU, and such models and datasets are only expected to grow in size. Accordingly, only by training these machine learning models on multiple GPUs using some form of parallelization may sufficiently improve performance in that training be achieved.

Thus, most training of machine learning models is accomplished using distributed computing systems comprising multiple computing devices, where each of those computing devices may comprise one or more GPUs utilized in parallel. Data may be communicated between the processes executing on the GPUs according to a peer-to-peer communication topology where processes send data directly to other process, or using a collective communication topology whereby processes executing on different GPUs may be grouped into a collective, such that the processes of that collective can perform and synchronize certain operations involved in the training of the model (e.g., scatter, gather, all-reduce, broadcast). The processes in such a collective may communicate with one another according to a communication topology such as a ring, tree, or all-to-all communication topology.

As may be realized, training of machine learning models in this manner may entail the movement of a sizable amount of data over the network of the distributed computing system. As such, the processes involved in machine learning training (or other types of applications utilizing processes executing on distributed computing systems) may utilize network protocols or hardware designed to facilitate the rapid or reliable transfer of data over networks (in other words to accelerate this transfer of data). One such network protocol is Remote Direct Memory Access (RDMA) over Converged Ethernet (ROCE). RDMA is a remote memory management capability that allows data movement (e.g., process to process) directly between memory without any CPU involvement. RDMA may, for example, be implemented in association with a network interface (e.g., network adapter) such as a Network Interface Card (NIC) or the like. ROCE allows RDMA over an Ethernet network. Since ROCE enables direct access to memory data via a network interface (e.g., rather than through the kernel) it can enable low-latency and high-performance transmission. While ROCE v1 was an Ethernet link layer protocol, ROCE v2 utilizes the User Datagram Protocol (UDP) (e.g., using Internet Protocol (IP) and UDP headers and a particular UDP destination port value), and thus ROCE v2 packets may be routed.

For a variety of reasons, it may be desirable to observe characteristics of the data transfers or network usage in conjunction with the execution of these types of applications on distributed computing systems. For users executing applications on the distributed computing system, it is important to be able to ascertain if their application is performant, and if not, where the impediments to such performance are arising. The performance of these applications is important in these scenarios at least because computing devices in these distributed computing environments may be quite expensive.

Because of this expense, distributed computing systems are often implemented or maintained by third parties. Users who wish to execute such applications (e.g., machine learning model training) may buy time on these third party distributed computing systems and deploy their applications on the third party's distributed computing system accordingly. Thus, the performance of applications and these distributed computing systems is important to users so they can minimize the time required on these third party distributed computing systems, while the performance of the application on the distributed computing system is important to network administrators of these third party distributed systems so that their services may be efficiently provided to disparate users, or such that more users may utilize their platform at any given time.

Tracking the network performance or data transfers in these distributed computing systems is, however, difficult. Certain network protocols (e.g., ROCE v2) are designed to be lossless protocols and may have certain mechanisms to ensure packet delivery and reliability. These very same mechanisms may, however, cause ROCE v2 traffic in a network to slow down considerably. But the fact that ROCE v2 is a lossless protocol may also serve to disguise such issues. For example, network flows may be moving quite slowly (e.g., relative to a maximum achievable speed), but this lack of speed may not manifest in a traditional manner associated with packet drops or alarms. So, from a high level it appears the application and network are working fine, but problems may actually be occurring at a more granular level.

It is, however, unworkable to sample a large number of packets to detect these network problems. Namely, the packet rate for such high bandwidth protocols (e.g., ROCE v2) makes the sampling of a large fraction of packets untenable, as these packets cannot be determined, stored, and processed at wire speeds in such environments (e.g., without severely degrading network performance). Thus, techniques such as IPFix and Sflow and other packet sampling methods do not work particularly well as they cannot sample traffic at a sufficiently high rate in order to perceive effects that may explain the cause of network performance problems. Accordingly, typical techniques actually utilized to determine network problems involve running basic speed tests using packet sending and delivery times or other secondary indicia of network speed.

It is thus desirable to provide network monitoring mechanisms that can provide a holistic view of performance in networked environments that utilize these types of data transfers, and in particular data transfers that may be accelerated through the use of protocols or hardware (e.g., ROCE, including ROCE v2). Moreover, it is desired to be able to differentiate the sources or causes of performance problems in such network environments, including determining whether performance problems are originating at individual computing devices themselves (e.g., the hosts executing the processes comprising the applications executing on the distributed computing network) or whether the problems are being caused by performance issues of the network itself and, for such detected problems, the nature of those problems.

To those ends, among others, attention is now directed to embodiments of network monitoring systems and methods that utilize characteristics of data transfers to perform network monitoring by capturing a limited subset of that data transfer. As but one example, the characteristics of ROCE may be used to perform network monitoring by capturing a limited subset of ROCE packets. These captured packets can then be correlated to monitor the flows within the network and determine performance characteristics of the applications or the network with respect to those flows using the captured packets.

Before delving into particular embodiments, it may be helpful to discuss one version of ROCE (e.g., ROCE v2) in more detail. It will be noted here that in discussing embodiments herein the example of training machine learning models on distributed computing systems using applications that communicate using ROCE or ROCE v2 may be utilized, however one of ordinary skill in the art will understand that embodiments may be usefully applied in almost any network environment where applications (e.g., including other than machine learning model training applications) communicate utilizing data transfers with certain similar characteristics to ROCE (e.g., ROCE v2) including other types of network protocols that have similar characteristics, without loss of generality.

In these network environments, processes (also referred to as an application instance) for an application may be distributed across computing devices in a distributed computing environment and transfer data between themselves using ROCE v2. In many cases, these applications may utilize a library that provides such ROCE v2 functionality. Accordingly, an application instance (e.g., a process associated with an application) may have a certain amount of data (e.g., 1 GB) to write to a destination associated with another application instance (e.g., another process associated with the application). The first application instance may then send this data to the second application instance using ROCE v2 (e.g., by calling a function that provides ROCE v2 functionality in a library). In some cases, the first application instance may separate the data to be sent into a set of chunks (e.g., 1 MB chunks of the 1 GB of data) and separately send each of those chunks to the second application instance (e.g., by calling the function with the ROCE v2 functionality in the library for each of the chunks).

The data (e.g., each chunk of data) can then be sent to the second application instance (e.g., a memory space associated with the second application) using ROCE v2. The transmission of data over ROCE v2 (e.g., for writes larger than one maximum transmission unit (MTU)) comprises a set of packets with each packet having a source and destination IP address and including a ROCE header marked with an opcode and having a packet sequence number and a destination queue pair (QP). ROCE v2 writes use multiple opcodes for different packets. The first packet of the set of packets for a data write will be marked with a write first opcode (e.g., RC_WRITE_FIRST) and includes the size of the entire write. Thus, from this size it is possible to determine the number of packets in the set of packets (e.g., with a common MTU size of 4 KB, a 1 MB write will comprise a set of 256 packets). The last packet of the set of packets is marked with a write last opcode (e.g., either a RC_WRITE_LAST or RC_WRITE_LAST_WITH_IMMEDIATE opcode). Each of the packets of the set in between the first packet and the last packet will include a middle opcode (e.g., RC_WRITE_MIDDLE). Accordingly, a write of data between application instances using ROCE v2 may include the transmission of a set of chunks (e.g., 1 MB) with each transmission of a chunk comprising a set of packets delimited with an initial packet having a write first opcode and a last packet having a write last opcode.

Embodiments as disclosed may thus determine a ROCE (e.g., ROCE v2) packet that has a write first opcode to determine a first packet of a write and capture this write first packet. The corresponding write last packet for that write may also be captured by determining a ROCE (e.g., ROCE v2) packet that has a write last opcode and where that packet corresponds to the previously captured write first packet. This write last packet may also be captured. In particular, opcode comparisons can be made for packets using hardware (e.g., a TCAM) at network devices in the network. When a write first opcode or write last opcode is matched in a packet that packet may be captured by storing it (e.g., in a buffer or the like) for subsequent processing. In some cases, when capturing these write first and write last packets, the packet may be truncated, or only certain data of the packet captured, to reduce the amount of data that is captured at the network device. Captured write first packets and write last packets may be associated based on information included in the packets such as source IP, destination IP, destination QP, or sequence numbers included in the packet.

It will be noted here, that while embodiments herein may described with respect to an example data transfer using ROCE (e.g., ROCE v2) where the data transfer is demarcated or otherwise delineated using a write first packet and a write last packet, other embodiments may also apply with equal efficacy to almost any other type of data transfer using protocols or hardware where the start and the end of the data transfer is delineated (e.g., in the data transfer itself, such as in a packet associated with the data transfer), including, for example, such data transfers using InfiniBand or Ultra Ethernet Consortium's Ultra Ethernet Transport (UET). For example, an RDMA send may employ SEND first and SEND last packet (and possibly a SEND middle) while an RDMA read may employ READ first and READ last packets (and possibly a READ middle). All such embodiments of network monitoring using delineated data transfers are fully contemplated herein without loss of generality.

In one embodiment, a tuple comprised of a source IP, destination IP and destination QP may be used to define a flow, thus the demarcated packets (e.g., the write first and write last packets) with the same tuple may be associated with that flow, and one another, at the network device. Other checks may also be utilized to determine the correspondence between a write first packet of a flow and a write last packet associated with that flow. For example, the sequence numbers of the write first packet of a flow may be compared with the sequence number of write last packet of the flow to determine that the write first packet and the write last packet are the first and last packet of the same write (e.g., it is possible to determine how many packets are in the set of packets of a write based on the size of the write as indicated in the write first packet, thus the sequence numbers in the write first packet and a corresponding write last packet should correspond to that number of packets).

By capturing only the write first and the write last packet of a write the performance of the entire write can be evaluated while sampling only two packets of the entire set of packets of a write (e.g., by sampling only 1/128 packets when the write includes 256 packets). Specifically, as most network interfaces are designed such that they can send RDMA writes at wire rate (e.g., if the network does not backpressure), the rate at which that write occurred can be accurately determine using timestamps associated with the corresponding captured write first and write last packets for the write. As discussed previously, applications may send data as chunks such that a write for each of those chunks may be initiated by the application. Thus, by capturing the write first and write last packet associated with writes for different chunks of a data transfer, a time between writes of those chunks can be determined (e.g., based on a difference between first timestamp associated with a write last packet for a write of a chunk and a second timestamp associated with a subsequently received write first packet for a write of a subsequent chunk of data).

It will be noted that a single ROCE, ROCEv2, or similar transport session, or connection, may contain multiple delimited WRITE, SEND, or READ calls in the session, so that it may be desired not to merely or only monitor packets that indicate the start and end of the session, but rather the start and end of each individual chunk or data transfer may be monitored, and there may be many chunks or data transfers, written, sent, or read, over a single instance of a transport session or connection.

Accordingly, it can be determined if a particular write (e.g., the write of a single chunk of data) is performing slower than some threshold based on the difference between corresponding captured write first and write last packets for that write. If that write is performing slower than expected, it may be determined that the network is not performant and is slowing down application flows. If, instead, the time between writes of different chunks of a data transfer is greater than some threshold, it can indicate that it is the host (e.g., the application, application instance or the computing device on which the application instance is executing) that is not performant. Network data, including such information or determinations (e.g., regarding the network or the host, including application data on applications on the host) may, for example, be provided to a user through an interface associated with a network monitoring application.

The capturing of corresponding write first and write last packets for a write may also be utilized by embodiments to determine if the write itself is creating congestion or impacting latency on the network. In particular, the latency of the write first and write last packets across the network can be determined (e.g., by comparing timestamps associated with captured packets at different network devices in the network). If the difference in the latency of the write last packet is greater by some amount than the latency of the write first packet it may be determined that the write itself is impacting the network (e.g., creating additional latency). Additionally, it can be determined if this pattern repeats itself across the writes for different chunks (e.g., of the same data transfer). For example, if a latency associated with a write first packet for a subsequent chunk drops significantly (e.g., to a level similar to the write first packet of write of a previous chunk) while the latency for the write last packet again rises in a significant manner, the determination that the write is impacting the network may be reinforced. Network data, including such information or determinations may again be provided to a user through an interface associated with a network monitoring application.

In one embodiment, to ensure a more correct determination of latency across network devices, it may be desired to ensure that accurate timestamps can be determined in association with these captured write first and write last packets. As such, in one embodiment, a mechanism for providing synchronized timestamps in a network may be utilized to provide timestamps on such packets. In this manner, latency of packets may be more accurately determined.

As discussed above, it may be desired to capture the exact same packets across multiple devices in the network. However, because of processing, storage, or other limitations involved in packet capture in high wire rate networks, it is also desired to reduce the number of packets that need to be captured while still providing adequate data on network or application performance to users of network monitoring applications. For example, even the capturing of only every write first and write last packet for every write in the network may prove problematic. Accordingly, it may be desirable to filter packets for capture even further. Traditional random sampling, or sampling some particular number of packets, may be utilized. The use of such sampling may, however, not adequately capture the write first and write last packets of the same write (e.g., which would prevent reliably measuring the latency of an individual write).

What is desired is to capture a full write (e.g., a write first packet and corresponding write last packet) on a periodic basis. While time window sampling could be used to accomplish such capturing on a single device, it is desired that the same full write be captured across multiple devices in the network. Time window sampling will usually not suffice (e.g., as it may require the ability to precisely enable and disable sampling according to synchronized clocks on multiple different network devices). To illustrate in more detail, in distributed time window sampling, clocks on two or more devices are synchronized, and a mechanism is provided to enable sampling at a particular time and disable it at another time. These time windows are coordinated by configuration, or through a communications protocol. Configurations of the sampling window may be coordinated through a central controller. If the length of the time window is sufficiently long to account for transmission and queueing delays and clock skew, then the same packet can possibly reliably be sampled at both devices by using the same filter at both devices. However, a sufficiently long window that can account for the delays and skew may necessitate undesirably infrequent polling intervals.

As such, embodiments may utilize the packet sequence numbers included in these ROCE (e.g., ROCE v2) packets to filter packets for capturing at network devices. Namely, packets may be captured only if they are write first or write last packets, and if the packet sequence number of the packet matches a range of packet sequence numbers. In this manner, a network monitoring application deployed across different network devices in the distributed computing system may be assured of capturing the same write first and write last packets by using the same matching algorithm (or matching values) for only capturing packets with particular packet sequence numbers. For example, a filter may be implemented that matches on certain bits of the packet sequence number (e.g., a certain number of bits in the middle of the packet sequence number or the most significant bits or the packet sequence number) while masking certain other bits of the packet sequence number (e.g., one or more of the most significant bits or one or more of the least significant bits). For example, if it is desired to match on 1/16 of the flows, the least significant 10 bits of the packet sequence number can be masked to match a continuous set of 1000 packets. The next 4 bits can then be matched to 0. This will match sets of 1000 packets for a flow, but only 1/16 of such flows. As another example, if a packet sequence number is 24 bits, by masking the six most significant bits, and the 10 least significant bits, and thereby matching on the set of eight middle bits), 1024 out of every 262,000 packets may be matched.

As can be seen then, embodiments may determine and provide data on a network, an application utilizing the network, or individual flows of those applications, to users of network monitoring applications. As discussed, many of the applications that utilize distributed computing systems, such as machine learning model training or the like, may utilize collectives in their implementation. In many instances, these collectives may drive the performance of these applications. Thus, it is highly desirable to group flows in the network according to these collectives such that performance of these collectives within an application may be individually analyzed. This ability may be especially important to third party providers of distributed computing systems where these applications are run as hosted applications on these distributed computing systems. In these circumstances the third party may not own the applications hosted on their distributed computing system and may not have visibility into those applications. Network administrators associated with those distributed computing systems may, however, still wish to obtain performance data on collectives of those applications despite this lack of visibility.

Embodiments may therefore collate flows into collectives based on the captured write first and write last packets of those flows. In one embodiment, the write size associated with captured packets of different flows may be utilized to group those flows into a collective. To illustrate in more detail, applications may utilize libraries that provide ROCE v2 functionality to transfer data as discussed. These libraries may utilize different write sizes for different communication topologies (where the last write will be sized based on the remaining data). For example, the Nvidia Collective Communication Library (NCCL) (e.g., version 2.19.3) uses 1

MB for collectives that use a ring topology, 512 KB for collectives that use a tree topology and 128 KB for point-to-point communications. Thus, flows that contain the same write sizes as other flows are likely to be part of the same collective and may be grouped into collectives based on having the same write size included in the write first packets captured for such flows. Network data on these flows can then be presented together as a collective through an interface associated with a network monitoring application.

Additionally, or alternatively, data from the captured packets associated with different flows such as source or destination IP addresses or QPs may be provided to a topology analyzer to generate the topologies utilized to implement such collectives (e.g., to recreate the topologies created by the libraries implementing ROCE v2). Such topology analyzers can, for example, follow the transitive closure of (e.g., all or a subset of) flows between computing devices (e.g., using the source IP and destination IP addresses for these flows). Those flows may encompass all devices that are part of the same collective and these flows may thus be grouped into a collective. Network data on such flows can then be presented together as a collective through an interface associated with a network monitoring application. The aforementioned write size information that is gleaned from captured packets can be provided to the topology analyzer to further identify collectives.

As can be seen then, embodiments as disclosed may have a number of advantages, including providing the ability to provide specific data on the network and applications in distributed computing systems, including individual collectives associated with such applications, using specific attributes of ROCE (e.g., ROCE v2) flows, all while capturing a minimal number of packets. Such network data allows network monitoring applications and their users to obtain a significant understanding of these applications and networks without disrupting the network or applications executing thereon.

Turning now to FIG. 1, a block diagram depicting a general architecture of a network including one embodiment of a network monitoring system is presented. Network 104 includes a number of communicatively connected computing devices 102 (referred to herein as network devices without loss of generally). These network devices 102 may be connected through one or more wired or wireless communication networks such as a Local Area Network (LAN), a Wide Area Network (WAN), an internet (e.g., the Internet), an intranet, a cellular network, or almost any other type of communication network. It will be noted that network 104 may include one or multiple types of communication networks and that the network devices 102 on the network 102 may be connected to other networks (e.g., the Internet) through the network 104. These devices (e.g., application instances on these devices) may utilize certain network protocols to facilitate the rapid or reliable transfer of data between themselves. These protocols may include, for example, ROCE or ROCE v2.

Network devices 102 included in network 104 may thus include a number of different types of devices, including devices 102*a* comprising the infrastructure of the network such as routers, switches, gateways, firewalls, etc. Infrastructure network devices 102*a* may be (e.g., implement) a network monitoring system that observes, determines, stores, and makes accessible data regarding the operation of network 104. In particular, embodiments of network monitoring systems 102*a* may utilize characteristics of ROCE to perform network monitoring by capturing a limited subset of ROCE packets as they flow through these network devices 102*a*. The network monitoring systems 102*a* can correlate these captured packets to monitor flows within network 104 and determine network data (e.g., network performance data such as characteristics of the applications or the network 104) with respect to those flows using the captured packets. This network data determined by the network monitoring system 102*a* can then be accessed through an interface of the network monitoring system 102*a*.

It may be useful at this point to discuss the use of embodiments of network monitoring systems in association with an implementation of ROCE. Looking at FIG. 2 then, one embodiment of a network monitoring system that may utilize characteristics of ROCE to perform network monitoring by capturing a limited subset of ROCE packets is depicted. In network environment 200, application instances for an application 230 (or different applications that wish to communicate, etc.) may be distributed across computing devices 202 in a distributed computing environment and may transfer data between themselves using ROCE (e.g., ROCE v2). In many cases, these application instances 230 may utilize a library 232 that provides such ROCE v2 functionality. As discussed, these applications 230 may be machine learning or artificial intelligence applications that may transfer a large amount of data between themselves.

Accordingly, an application instance 230*a* (e.g., a process associated with an application) may have a certain amount of data (e.g., 1 GB) to write to a destination associated with another (e.g., instance of an) application 230*b* (for example, another process associated with the application 230). The first application instance 230*a* may then send this data to the second application instance 230*b* using ROCE v2 (e.g., by calling a function that provides ROCE v2 functionality in library 232). In some cases, the first application instance 230*a* may separate the data to be sent into a set of chunks (e.g., 1 MB chunks of the 1 GB of data) and separately send each of those chunks to the second application instance using individual writes 240*a*-240*n* (e.g., by calling the function with the ROCE v2 functionality in the library 232 for each of the chunks).

The data (e.g., each chunk of data) can then be sent to the second application instance 230*b* (e.g., a memory space 234 associated with the second application instance 230*b*) in a write 240 using ROCE v2. The transmission of data over ROCE v2 (e.g., for writes larger than one maximum transmission unit (MTU)) comprises a set of packets 210 with each packet 210 having a source and destination IP address (e.g., associated respectively with device 202*a* and 202*b* or application instance 230*a* and 230*b*). The packets 210 also include a ROCE header marked with an opcode and having a packet sequence number and a destination queue pair (QP).

ROCE v2 writes use multiple opcodes for different packets. The first packet 210*a* of the set of packets for a data write 240 will be marked with a write first opcode (e.g., RC_WRITE_FIRST) and includes the size of the entire write 240. Thus, from this size it is possible to determine the number of packets 210 in the set of packets 210 comprising the write 240 (e.g., with a common MTU size of 4 KB, a 1 MB write will comprise a set of 256 packets). The last packet 210*n* of the set of packets 210 for the write 240 is marked with a write last opcode (e.g., either a RC_WRITE_LAST or RC_WRITE_LAST_WITH_IMMEDIATE opcode). Each of the packets 210*x* of the set of packets 210 of the write 240 that is in between the first packet 210*a* and the last packet 210*n* will include a middle opcode (e.g., RC_WRITE_MIDDLE). Accordingly, a write 240 of data between application instances 230 using ROCE v2 may include the transmission of a set of chunks (e.g., 1

MB) with each transmission of a chunk comprising a set of packets 210 delimited with an initial packet having a write first opcode and a last packet having a write last opcode. These packets 210 for each write 240 are routed through network 204 by (infrastructure) network devices 220*a*-220*n*. These network devices 220*a*-220*n* may perform processing on these packets 210 as they pass through the network devices 220 and may, in certain cases, add data to these packets 210 or determine certain data regarding the packets, such as timestamp data associated with the packets 210 as they pass through the network devices 220*a*-220*n*. Such timestamps can, for example, be determined in a manner such that the time used to timestamp these packets at network devices 220*a*-220*n* may be synchronized between network devices 220*a*-220*n*.

One or more of these network devices 220 may comprise a network monitoring system that performs network monitoring by capturing a limited subset of ROCE packets 210 as they flow through these network devices 220. The network monitoring systems on these network devices 220 can correlate these captured packets 210 to monitor flows within network 204 and determine network data with respect to those flows using the captured packets 210.

In particular, a network monitoring system at one or more of network devices 220 may determine a ROCE v2 packet 210 that has a write first opcode to determine a first packet 210*a* of a write 240, and to capture this write first packet 210*a*. The corresponding write last packet 210*n* for that (e.g., same) write 240 may also be captured by determining a ROCE v2 packet 210 that has a write last opcode and where that packet 210 corresponds to the previously captured write first packet 210*a*. This write last packet 210*n* may also be captured. In one embodiment, a tuple comprised of a source IP, destination IP and destination QP may be used to define a flow, thus (captured write first and write last) packets 210*a*, 210*n* associated with the same tuple may be associated with that flow, and one another, at the network device.

The network monitoring system on network devices 220 can thus monitor flows within network 204 and determine network data (e.g., network performance data such as characteristics of the applications or the network 104) with respect to those flows using the captured packets. Importantly, by capturing only the write first 210*a* and the write last 210*n* packet of a write 240, the performance of an entire write 240 can be evaluated while sampling only two packets 210*a*, 210*n* of the entire set of packets 210 of a write 240. Moreover, by capturing the write first 240*a* and write last packet 210*n* associated with writes 240*a*, 240*n* for different chunks of a data transfer, a time between writes 240 of those chunks can be determined (e.g., based on a difference between first timestamp associated with a write last packet for a write of a chunk and a second timestamp associated with a subsequently received write first packet for a write of a subsequent chunk of data).

Utilizing these captured packets 210*a*, 210*n* for different writes for a flow in network 204, network monitoring system on network device 220 can determine if a particular write 240 (e.g., the write of a single chunk of data) is performing slower than some threshold based on the difference (e.g., of a time of reception) between corresponding captured write first 240*a* and write last packets 240*n* for that write. If that write 240 is performing slower than expected, network data indicating that network 204 is not performant and is slowing down application flows may be determined. If, instead, the time between writes 240 of different chunks (e.g., writes of a subsequent chunk of data) of a data transfer is greater than some threshold, network data can be determined indicating that it is the host (e.g., the application instance 230 or the computing device 202 on which the application instance 230 is executing) that is not performant. This determination can be made by comparing a time associated with a captured write last packet 210*n* of a write for a chunk of data for a data transfer for a flow with a captured write first packet 210*a* of a write for an (e.g., immediately) subsequent chunk of data for the same data transfer for the same flow. Network data, including such information or determinations (e.g., regarding the network or the host) may, for example, be provided to a user through an interface associated with the network monitoring system at the network device 220.

The network monitoring system at a network device 220 may also utilize corresponding captured write first 210*a* and write last packets 210*n* for a write 240 to determine if the write 240 itself is creating congestion or impacting latency (e.g., the time it takes for a packet to travel between a source and destination) on the network 240. In particular, the latency of a (e.g., same) write first and write last packet 210*a*, 210*n* across the network can be determined (e.g., by the network monitoring systems at different network devices 220 in the network). For example, a write first packet 210*a* for write 240*a* may be captured at a first network device 220*a* and associated with a first timestamp (e.g., reflecting the time of capture or reception at network device 220*a*). This same write first packet 210*a* may also be captured at a second network device 220*n* and associated with a second timestamp (e.g., reflecting the time of capture or reception at network device 220*a*). The difference between the first timestamp associated with the write first packet 210*a* and the first network device 220*a*, and the second timestamp associated with the write first packet 210*a* and the second network device 220*a* is reflective of a latency of that write first packet 210*a* across network 204. A determination of a latency measure of the corresponding write last packet 210*n* for that same write 240 can be determined in a similar manner.

If the difference in the latency (e.g., the latency measure) of the write last packet 210*n* is greater by some amount than the latency of the write first packet 240*a* for a write 240 it may be determined that the write 240 itself is impacting the network (e.g., creating additional latency). Additionally, it can be determined if this pattern repeats itself across the writes 240*a*-240*n* for different chunks (e.g., of the same data transfer). For example, if a latency associated with a write first packet 210*a* for a write of some subsequent chunk of data for a data transfer drops significantly (e.g., to a level similar to the write first packet 210*a* of a write 240 of a previous chunk) while the latency for the write last packet 240*n* for that write 240 again rises in a significant manner, the determination that the write 240 is impacting the network may be reinforced. Network data, including such information or determinations may again be provided to a user through an interface associated with the network monitoring system at the network device 220.

Figure 3B:
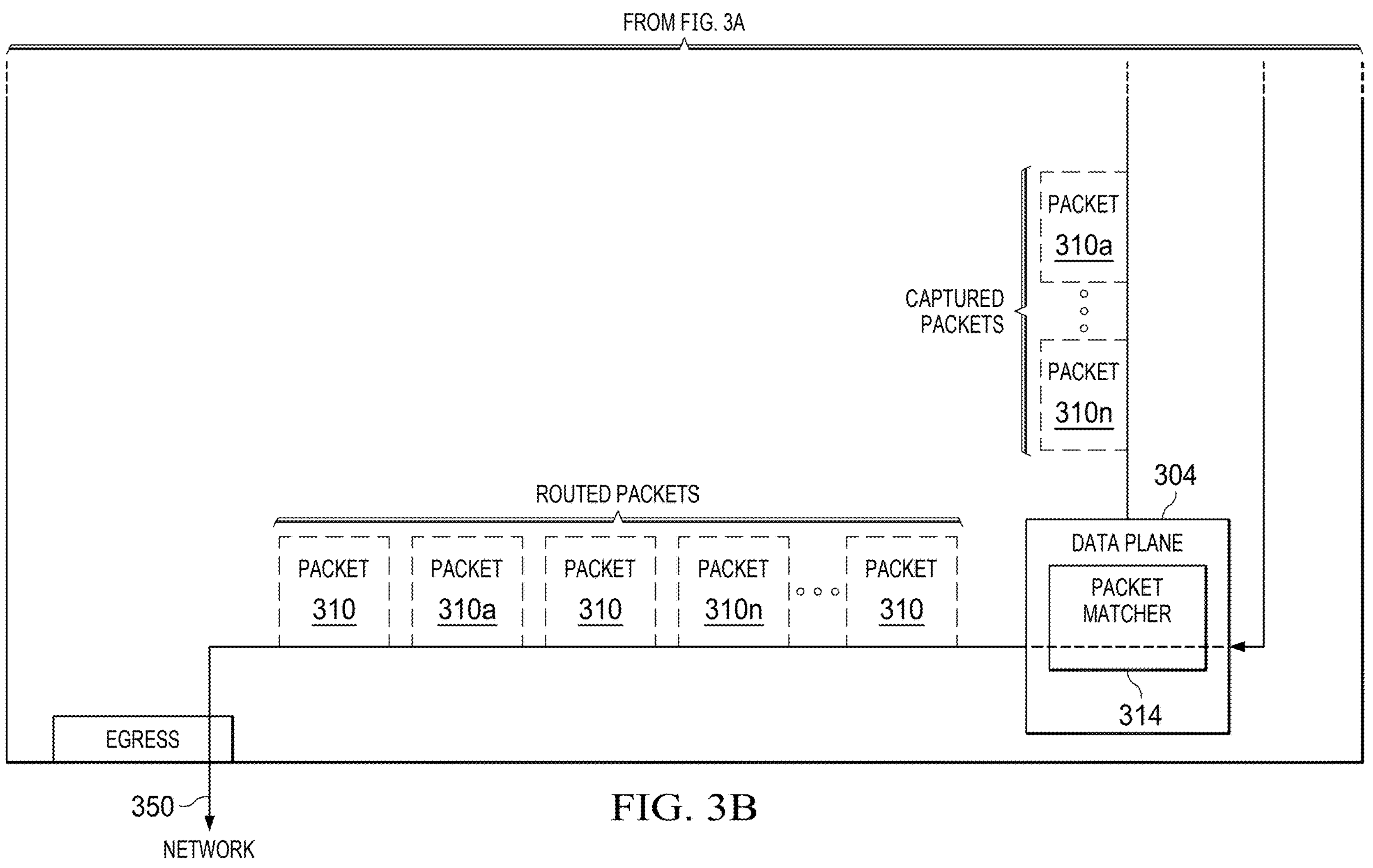

Moving on to FIG. 3, a more detailed depiction of a network device implementing one embodiment of a network monitoring system is presented. Network device 300 may include two different planes that are used to process network traffic: control plane 302 and data plane 304 (sometimes referred to as a forwarding plane). Control plane 130 may include central processing unit (CPU) 132. Among other processes, this CPU may run an operating system or other software which may be stored in the memory of the network device. Using configuration information (e.g., such as routing information stored in forwarding tables at the network device 300), the operating system software or other software may program data in data plane 304.

The data plane 304 receives, processes, and forwards network traffic using various configuration data (e.g., forwarding, security, quality of service (QOS), or other network traffic processing information (e.g., including that configured by the control plane 302). For example, for each received packet 310 of network traffic, the data plane 304 determines a destination address of that packet 310, looks up the requisite information for that destination in one or more tables stored in the data plane 304, and forwards the packet out the proper outgoing interface. Specifically, data plane 304 may include a packet processor utilized in the implementation of a packet processing pipeline adapted to implement one or more stages for forwarding a received packet 310 by analyzing header fields of the received packet. In operation, then, network device 300 may receive data packets 310 from one or more hosts on network 350 through ingress interfaces (e.g., ports) of network device 300 coupled to network 350. These packets 310 may be processed by data plane 304 (e.g., including the packet processing pipeline) to forward these packets 310 over a corresponding egress interface (e.g., port) coupled to network 350.

As discussed, many applications on hosts in network 350 (e.g., machine learning or other artificial intelligence applications) may communicate using ROCE (e.g., ROCE v2) such that many packets 310 forwarded by network device 300 may be ROCE packets generated for by these applications. Accordingly, a network monitoring system may be implemented on network device 300 to utilize characteristics of ROCE to perform network monitoring by capturing a limited subset of these ROCE packets. These captured packets can then be correlated to monitor the flows within the network 350 and determine performance characteristics of the applications or the network 350 with respect to those flows using the captured packets.

Such a network monitoring system can include a packet matcher 314 that may be implemented in data plane 304. Packet matcher 314 is adapted to capture write first and write last ROCE packets as they are forwarded by data plane 304. Capturing packets 310 as used herein will be understood to mean storing at least a (e.g., duplicate of a) portion of the data of the packet 310 in a particular storage location. Thus, as packets 310 are forwarded by the data plane 304 of the network device, packet matcher 314 may determine packets 310 that are ROCE packets (e.g., ROCE v2 packets) that are write first packets and write last packets (e.g., 310*a* and 310*n*) and capture these packets 310*a*, 310*n* by storing these write first and write last packets (e.g., 310*a* and 310*n*) in buffer 312 associated with control plane 302. While depicted as part of control plane 302 for ease of depiction, buffer 312 may be part of storage included in data plane 304 and accessible by instructions executing in control plane 302. In general, then, buffer 312 may be an area of memory where captured packets 310*a*, 310*n* may be stored and accessible by elements of control plane 302.

To capture ROCE write first and write last packets, packet matcher 314 may make opcode comparisons packets 310 using hardware (e.g., a TCAM) in data plane 304. When a write first opcode or write last opcode is matched in a packet (e.g., 310*a* and 310*n*) by packet matcher 314 that packet 310*a*, 310*n* may be captured by storing it in buffer 312. In some cases, when capturing these write first and write last packets (e.g., 310*a* and 310*n*), the packet may be truncated, or only certain data of the packet captured, to reduce the amount of data that is captured at the network device 300.

As the network monitoring system may be utilized at multiple network devices 300 within the network 350, it may be desired to capture the exact same packets (e.g., 310*a*, 310*n*) across multiple devices 300 in the network 350. For example, it may be desired to capture the same packets at different network devices 300 such that an analysis of those same network packets may be performed based on the timing or other aspects of that same packet as it travels through network 350 between network devices 300 or otherwise across network 350. However, because of processing, storage, or other limitations involved in packet capture in high wire rate networks, it is also desired to reduce the number of packets that need to be captured while still providing adequate data on network or application performance to users of network monitoring applications. For example, even the capturing of only every write first and write last packet for every write in network 350 may prove problematic. Accordingly, it may be desirable to filter packets for capture even further.

Accordingly, packet matcher 314 may employ a packet filter in the capturing of packets 310. Such a packet filter may employ traditional random sampling, or may sample some particular number of packets. The use of such sampling may, however, not adequately capture the write first and write last packets of the same write. What is desired is to capture a full write (e.g., a write first packet and corresponding write last packet) on a periodic basis. While time window sampling may be employed by a filter of packet matcher 314 to accomplish such capturing on a single device 300, as mentioned it is desired that the same full write be captured across multiple devices in the network.

As such, embodiments of packet matcher 314 may utilize a filter that filters packets 310 for capture based on the packet sequence numbers included in ROCE (e.g., ROCE v2) packets. Namely, packet matcher 314 may capture a packet 314 only if is a write first or write last packet (e.g., has a write first or write last opcode), and if a packet sequence number of the packet 310 matches a range of packet sequence numbers. In this manner, a network monitoring system deployed across different network devices 300 in the network 350 may be assured of capturing the same write first and write last packets by using the same matching algorithm (or matching values) for only capturing packets with particular packet sequence numbers.

As but one embodiment, a filter may be implemented by packet matcher 314 where that filter matches on certain bits of the packet sequence number of the packet 310 (e.g., a certain number of bits in the middle of the packet sequence number or the most significant bits or the packet sequence number) while masking certain other bits of the packet sequence number (e.g., one or more of the most significant bits or one or more of the least significant bits). For example, if it is desired to match on 1/16 of the flows, the least significant 10 bits of the packet sequence number can be masked to match a continuous set of 1000 packets. The next 4 bits can then be matched to 0. This will match sets of 1000 packets for a flow, but only 1/16 of such flows.

In one embodiment, to determine the implementation of such matching for implementing a packet filter for packet matcher 314 it can be determined a desired size of a write that it is desired to capture. The number of least significant bits to mask for the packet filter can be determined to be around (a number of bits that can express a value that is) twice the size of the determined size for the write to be captured. So, for example, for a determined write size of 1 MB write (e.g., which may comprise 256 packets), the number of least significant bits to mask may be chosen as 9 bits (e.g., which can represent 512 different values, twice 256). With an expected write size of 1 MB, it may be desired to sample 1/128 packets. Thus, it can also be determined what rate of sampling packets is desired for the packet filter. This ratio can be used to determine how many most significant bits of the packet sequence number to mask when matching packets when implementing a filter for packet capture. Continuing with the above example, if it is desired to sample 1 in 16k packets, then 16k can be divided by 128. This determination indicates the packet filter may need to further reduce captured packets by 9 bits. Thus, the 9 least significant bits can be masked by the filter, the filter can match on bits 10:18 of the packet sequence number as being 0, and the filter can mask most significant bits 19:23 of the packet sequence number when matching.

Once packet matcher 314 determines a packet 310 to capture (e.g., packet 310*a*, 310*n*), that packet is stored in buffer 312. Network monitoring system may thus also include packet correlator 324 that processed captured write first and write last packets (e.g., 310*a*, 310*n*) in buffer 312 to determine network monitoring data 326. Specifically, packet correlator 324 may associate captured packets (e.g., 310*a*, 310*n*) with one another based on information included in the packets such as source IP, destination IP, destination QP, or sequence numbers included in the packet. This association includes associating packets that are part of the same data transfer or packets (e.g., a write first packet and a corresponding write last packet) that are part of the same write within a particular data transfer.

In one embodiment, a tuple comprised of a source IP, destination IP and destination QP may be used to define a flow, thus (write first and write last) packets with the same tuple may be associated with that flow, and one another, at the network device. Specifically, packet correlator 324 may access a captured packet in buffer 312 (e.g., packet 310*a*, 310*n*) and determine a tuple of source IP, destination IP and destination QP associated with the captured packet. If that flow (e.g., that tuple) is not yet identified in network monitoring data 326 (e.g., there is no entry for that flow in network monitoring data 326) packet correlator 324 may create this flow (e.g., an entry for this flow) in network monitoring data 326. Packet correlator 324 can also store that captured packet (310*a*, 310*n*), or data determined from that captured packet, in association with that flow in network monitoring data 326.

If the capture being processed by packet correlator 324 is a write last packet, the packet correlator 324 may also determine if there is a corresponding write first packet associated with that flow and associated that captured write last packet with that corresponding write first packet for that flow. Packet correlator 324 may utilize certain checks to determine a correspondence between a write first packet of a flow and a write last packet associated with that flow. For example, packet correlator 324 may compare sequence numbers of a write first packet of a flow with the sequence number of a captured write last packet of the flow to determine that the write first packet and the write last packet are the first and last packet of the same write (e.g., it is possible to determine how many packets are in the set of packets of a write based on the size of the write as indicated in the write first packet, thus the sequence numbers in the write first packet and a corresponding write last packet should correspond to that number of packets). Packet correlator 324 may also utilize other data in making such a determination regarding whether the write first packet and the write last packet are the first and last packet of the same write, such as a message size as included in a packet of the data transfer (e.g., the write first packet), a packet size of the packets of the data transfer, or some combination of this data.

Accordingly, network monitoring data 326 may include a set of flow entries 336, each flow entry corresponding to a flow defined by a combination of source IP, destination IP and destination QP. Each flow entry 376 may include a set of data transfers such as writes 328 (e.g., for each of one or more data transfers), where each write 328 may include data for an associated write first packet 310*a* and write last packet 310*n*. Using this network monitoring data 326, the network monitoring system can determine and provide network data 346 on network 350, an application utilizing the network 350, or individual flows 376, to users of the network monitoring system.

In one embodiment, therefore, the network monitoring system may include a flow analyzer 348 for determining flow data 352 from network monitoring data 326. This flow data 352 may include data on the performance of applications, hosts, or the network 350 such as timing data or alerts regarding the performance of such applications, hosts or network 350. Specifically, as most network interfaces are designed such that they can send RDMA writes at (or close to) wire rate (e.g., if network 350 does not backpressure), the rate at which a write 328 occurred can be accurately determine by flow analyzer 348 using timestamps associated with the corresponding captured write first 310*a* and write last packets 310*n* for the write 328. As noted herein, applications on hosts in network 350 may send data of a data transfer as chunks such that a write 328 for each of those chunks may be initiated by the application. Thus, by capturing the write first packet 310*a* and write last packet 310*n* associated with writes 328 for different chunks of a data transfer, a time between writes 328 of those chunks can be determined by flow analyzer 348 based on a difference between a first timestamp associated with a write first packet 310*a* (e.g., 310*a*1) for a write 328 (e.g., write 328*a*) and a second timestamp associated with a subsequently received write first packet 328*a* (e.g., 328*a*2) for a subsequent write 328*b* of a chunk of data.

Flow analyzer 348 can thus determine if a particular write 328 (e.g., for a particular flow 376) is performing slower than some threshold based on the difference between a captured write first packet 310*a* and a corresponding write last packet 310*n* for that write 328. If that write 328 is performing slower than expected (e.g., slower than a threshold, that may be configurable), flow analyzer 348 may determine that the network 350 is not performant and is slowing down flow 376 (e.g., an application associated with the flow 376). If, instead, a determined time between writes 328 of different chunks of a data transfer for a flow 376 is greater than some threshold, flow analyzer may determine that it is the host (e.g., the application, application instance, or the computing device on which the application instance is executing) that is not performant. Flow data 352 including such information or determinations (e.g., regarding the network or the host, such as IP address) may be stored by flow analyzer 348 such that this flow data 352 can be provided to a user through interface 372 associated with the network monitoring system. Flow analyzer 348 may also use metadata in the packets associated with a flow to determine flow data 352 associated with classification of the flows. This metadata may include metadata in write first packets associated with a flow such as a write size, a remote memory key, or a virtual address that may be utilized to classify the flow.

Flow analyzer 348 may also utilize corresponding write first packets 310*a* and write last packets 328*n* for a write 328 to determine if writes 328 are themselves creating congestion or impacting latency on network 350. In particular, the latency of each of a write first packet 310*a* and write last packet 310*n* across network 350 can be determined (e.g., by comparing the timestamp of each packet 310*a* as it is captured at different network devices 300 in the network). Flow analyzer 348 may make such a determination based on a first timestamp associated with the packet 310*a*, 310*n* reflecting the time of capture or reception at another network device on network 350 and a second timestamp associated with that packet 310*a*, 310*n* reflecting the time of capture or reception at network device 300.

If the difference in the latency of the write last packet 310*n* is greater by some amount than the latency of the corresponding write first packet 310*a* (e.g., for that same write 328), flow analyzer 348 may determine that write 328 itself is impacting the network 350 (e.g., creating additional latency for packets 310 on network 350). Additionally, flow analyzer 348 may determine if this pattern repeats itself across writes 328 for different chunks (e.g., of the same data transfer). For example, if a latency associated with a write first packet 310*a* (310*a*2) for a subsequent write 328 (e.g., 328*b*) of a data transfer for that same flow 376 drops significantly (e.g., to a level similar to the write first packet 310*a*1 of write 328*a* of a previous chunk) while the latency for the write last packet 320*n*2 for that subsequent write 328 (e.g., 328*b*) again rises in a significant manner, flow analyzer 348 may determine that writes 328 for that flow 376 are impacting the network 350. Flow data 352 including such information or determinations may again be stored as network data 345 and provided to a user through interface 372 associated with the network monitoring system.

As described then, embodiments of network monitoring systems may determine and provide data on network 350, an application (or application instance) utilizing network 350, or individual flows 376 of those applications, to users of the network monitoring system. However, many of the applications that utilize distributed computing systems including a network may employ collectives in their implementation. For example, machine learning or artificial intelligence applications may use collectives. In many instances, these collectives are significant drivers of the performance of these applications. Thus, it is highly desirable to group flows 376 in network 350 according to collectives, when possible, such that performance of these collectives within an application may be individually analyzed and network data 346 including collective data 354 may be determined and provided to a user.

Figure 4:
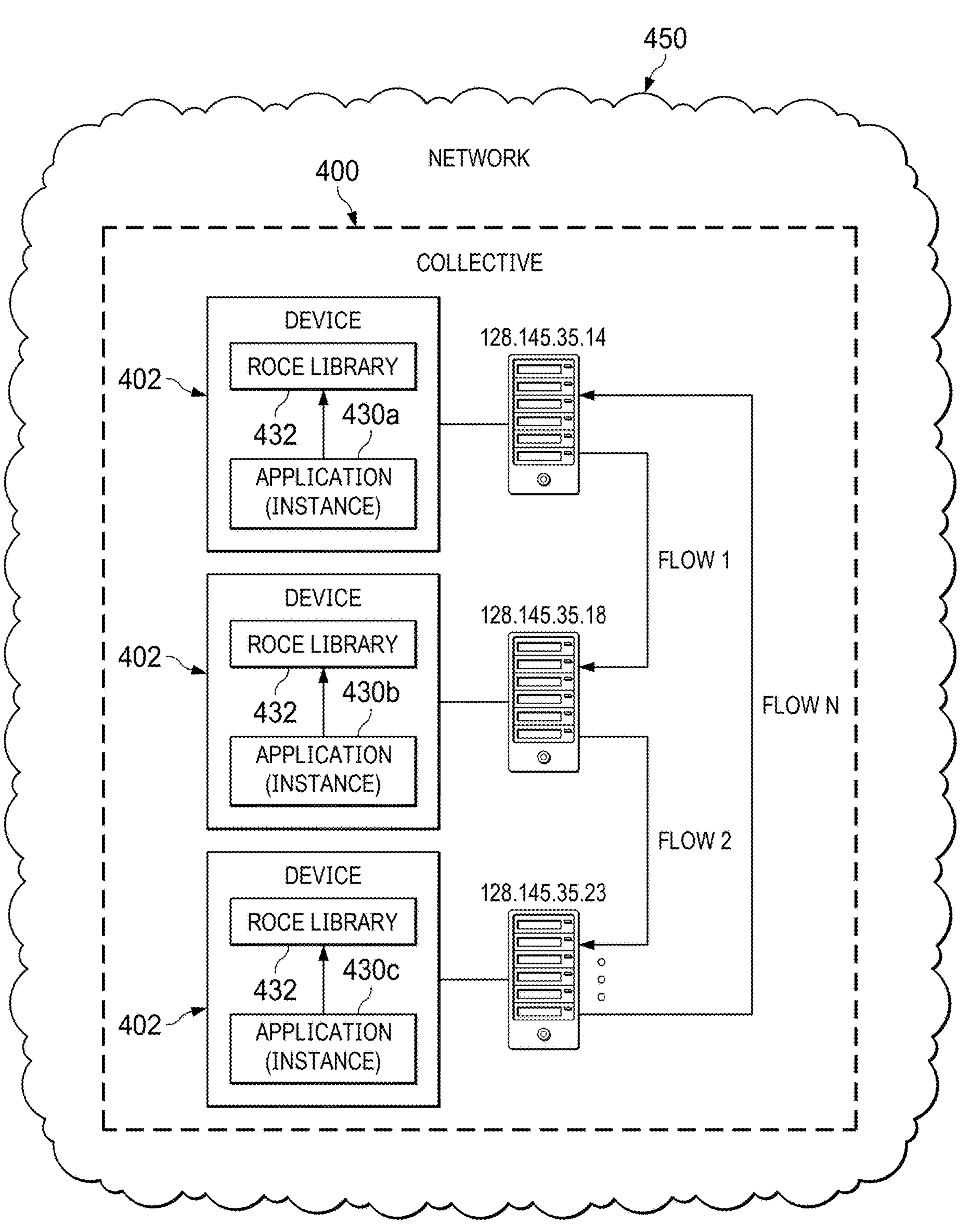
FIG. 4 is a block diagram depicting one example of a collective in a network.

Embodiments of a network monitoring system may therefore include collective analyzer 366 adapted to collate flows into collectives based on the captured write first or write last packets of those flows. It may be helpful here to illustrate an example of a collective. Referring briefly to FIG. 4 then, one example of a collective 400 in a network 450 is depicted. In network environment 450, processes for an application 430 (or different applications that wish to communicate, etc.) may be distributed across computing devices 402 in a distributed computing environment and may transfer data between themselves using ROCE (e.g., ROCE v2). These application instances 430 may utilize a library 432 that provides such ROCE functionality. As discussed, these application instances 430 may be machine learning or artificial intelligence applications that may transfer a large amount of data between themselves. Accordingly, application instances 430 may form, or utilize, a collective to implement collective operations in a single program, multiple data (SPMD) environment. These collectives may have different topologies, such as ring topology, a tree topology, a mesh topology, etc. In some cases, library 432 may facilitate the use of these collectives and may employ different communication strategies or parameters based on the topology of the collective.

The example collective 400 illustrates a ring topology where a first instance of application 430*a* is associated with IP address 128.45.35.14 and transfers data via ROCE to (e.g., a memory space accessible by) second instance of application 430*b* associated with IP address 128.45.35.18 (Flow 1). The second instance of application 430*b* associated with IP address 128.45.35.18 transfers data via ROCE to (e.g., a memory space accessible by) third instance of application 430*c* associated with IP address 128.45.35.23 (Flow 2). Third instance of application 430*c* associated with IP address 128.45.35.23 transfers data via ROCE to (e.g., a memory space accessible by) first instance of application 430*a* associated with IP address 128.45.35.14 (Flow N). Thus, using transitive closure to evaluate Flow 1 (128.45.35.14 to 128.45.35.18), Flow 2 (128.45.35.18 to 128.45.35.23), and Flow 3 (128.45.35.23 to 128.45.35.14) it can be determined that devices 402 and instances of application 430 are a collective and network data associated with these flows (1, 2, N) can be used to provide data on that collective to a user.

Returning then to FIG. 3, collective analyzer 366 may be adapted to analyze network monitoring data 326 and to determine collective data 354 by collating flows 376 into collectives based on the captured write first and write last packets (310*a*, 310*n*) of writes 328 of those flows 376. In one embodiment, collective analyzer 366 may utilize a write size associated with captured packets 310 of flows 376 to group flows 376 into one or more collectives. Specifically, the libraries utilized by an application to provide ROCE functionality to transfer data may utilize different write sizes for different communication topologies (e.g., the NCCL version 2.19.3 uses 1 MB for collectives that use a ring topology, 512 KB for collectives that use a tree topology and 128 KB for point to point communications). Thus, collective analyzer 366 may determine flows 376 that contain the same write sizes for packets 310 as other flows 376 may be grouped into collectives based on having the same write size included in the write first packets 310*a* captured for such flows 376. Collective data 354 on these flows 376 can then be determined and presented together as a collective through monitoring system interface 372. For example, metadata in write first packets (e.g., a write size, a remote memory key or a virtual address) may be utilized to classify the flows or collective.

Additionally, or alternatively, collective analyzer 366 may include a topology analyzer 368. Topology analyzer 366 can, for example, follow the transitive closure of (e.g., all or a subset of) flows 376 (e.g., using the source IP and destination IP addresses for these flows 376). As these flows 376 may encompass all devices (or IP addresses) that are part of the same collective topology analyzer 368 can group flows 376 into one or more collectives. Thus, network monitoring data 326 including data from the captured packets 310*a*, 310*n* associated with different flows 376 (e.g., such as source or destination IP addresses or QPs may) be provided to a topology analyzer 368 to evaluate topologies utilized to implement such collectives (e.g., to recreate the topologies created by the libraries implementing ROCE v2) and determine collectives from these flows 376 Collective data 354 on these flows 376 can then be determined and presented together as a collective through monitoring system interface 372.

Figure 5:
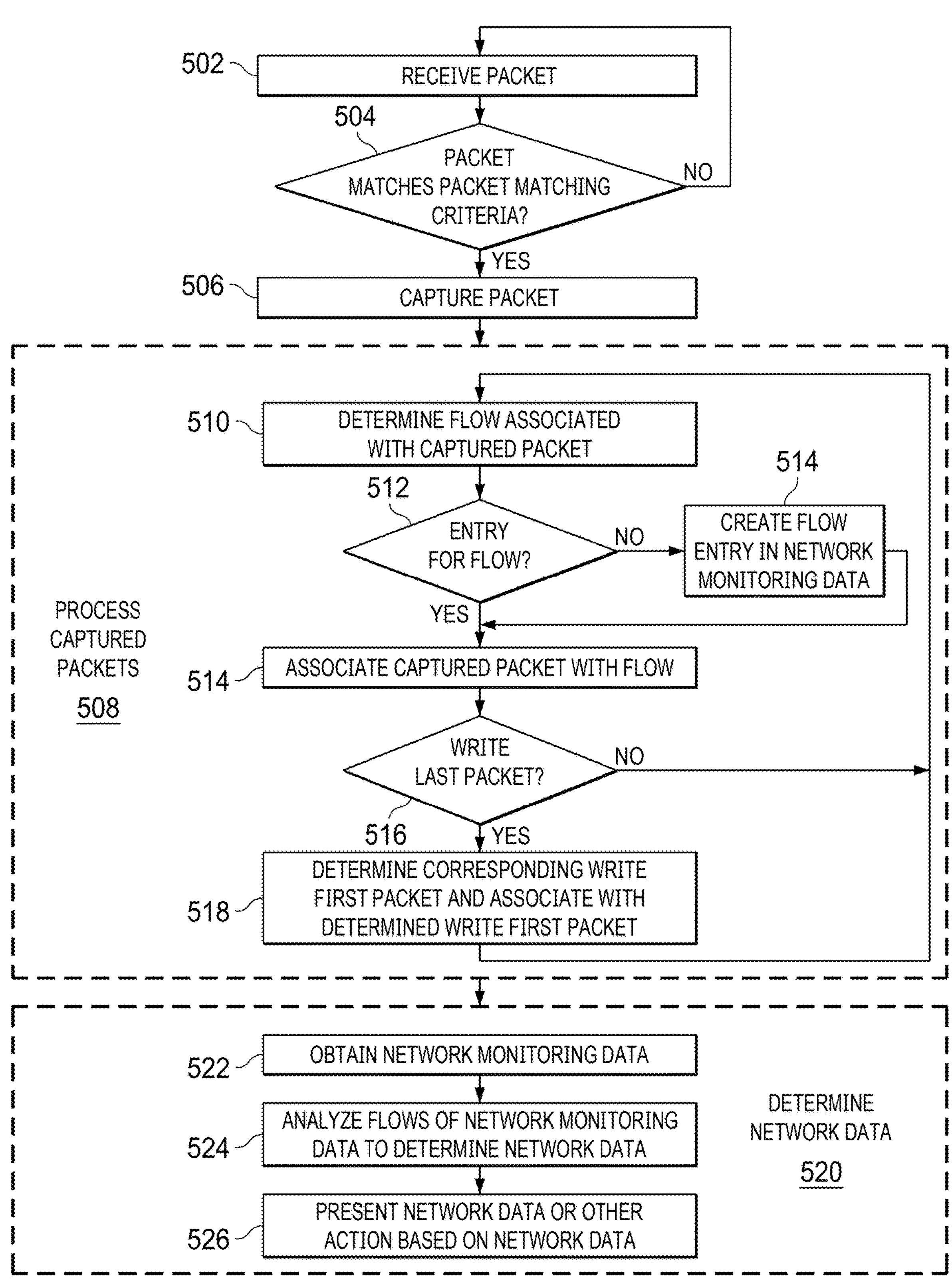
FIG. 5 is a flow diagram of one embodiment of a method for network monitoring.

FIG. 5 depicts one embodiment of a method for performing monitoring of network flows, including ROCE flows, at a network device while capturing a minimal number of packets. Accordingly, as packets are being processed (e.g., forwarded or routed) by a network device they may be received at a network monitoring system (STEP 502). For a received packet, it can be determined if that packet matches packet matching criteria (STEP 504). This criteria may include that the packet is a ROCE (e.g., ROCE v2) packet that includes a ROCE header with a write first opcode (e.g., RC_WRITE_FIRST) or a write last opcode (e.g., either a RC_WRITE_LAST or RC_WRITE_LAST_WITH_IMMEDIATE opcode). The packet matching criteria may also include criteria associated with the packet sequence number of the ROCE header. This criteria, can for example, be a range of packet sequence numbers. Thus, this criteria may be used to match a packet sequence number of a packet based on certain bits of the packet sequence number of the packet (e.g., a certain number of bits in the middle of the packet sequence number or the most significant bits or the packet sequence number) while masking certain other bits of the packet sequence number (e.g., one or more of the most significant bits or one or more of the least significant bits).

If the packet does not match the packet matching criteria, the packet may be forwarded, routed, or otherwise processed by the network device without being captured for network monitoring. If, however, the packet matches the packet matching criteria (Y branch of STEP 504), it can be captured (STEP 506). This capturing may (or may not be) in addition to forwarding the packet in a normal manner). Capturing the packet may include storing a copy of the packet or a portion thereof. For example, a captured packet may be a truncated version of the packet, or only certain data of the packet may be captured. Thus, as packets are received, they may be captured and stored if they meet the packet matching criteria.

These captured packets can be processed by the network monitoring system (STEP 508). It will be noted that the processing of these captured packets may be done asynchronously to the capture of these packets, such that the capturing of new packets may (or may not) be going on simultaneously with the processing of previously captured packets. Thus, when a captured packet is processed a flow (e.g., as defined by a tuple comprised of a source IP, destination IP and destination QP) may be determined from the packet (STEP 510). If that flow (e.g., that tuple) has not yet been identified in network monitoring data maintained by the network monitoring system (e.g., there is no entry for that flow in network monitoring data) (N branch of STEP 512) an entry for that flow may be created in the maintained network monitoring data (STEP 514) The captured packet, or data determined from that captured packet, may then be stored in association with that flow in the maintained network monitoring data (STEP 514).

If the capture being processed is a write last packet (Y branch of STEP 516), it can be determined if there is a write first packet for that flow that is associated with that write last packet. The determination of a corresponding write first packet may be made, for example, based upon packet sequence numbers of captured packets associated with that flow, on a message size as included in a packet of the data transfer (e.g., the write first packet), on a packet size of the packets of the data transfer, or some combination of this data. The captured write last packet can then be associated with that corresponding write first packet for that flow (STEP 518). After that captured packet is processed, if another packet has been captured (e.g., another captured packet is present in a storage location associated with captured packets), it may be processed (STEP 510).

This network monitoring data (e.g., including a set of flow entries associated with a set of data transfers and associated packets, such as writes with associated write first packets and write last packets) can be processed to determine network data (STEP 520). In particular, network monitoring data may be obtained (STEP 522). It will be noted again that the processing of this network monitoring data may be done asynchronously to the capture of packets and the processing of captured packets, such that the processing of network monitoring data may (or may not) be going on simultaneously with the capturing of packets or the processing of captured packets. The obtained network monitoring data can then be analyzed or otherwise evaluated to determine network data that may comprise, for example, data on a network, an application utilizing the network, collectives within the network, individual flows, or other network data (STEP 524). This network data may be presented to a user (e.g., in response to a request for such data through an interface), or another action may be taken based on such network data such as sending a reporting log with such network data, raising an alarm, etc. (STEP 526).

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A network device comprising:

one or more processors configured for:

receiving, at the network device, a set of packets communicated from a first host to a second host over the network, wherein the network device is an intermediary network device situated in the network between the first and second hosts, and wherein the set of packets include a first packet;

determining the first packet indicates a start of a data transfer;

capturing the first packet at the network device based on the determination the first packet indicates the start of the data transfer;

receiving a second packet at the network device;

determining the second packet indicates an end of the data transfer;

capturing the second packet at the network device based on the determination the second packet indicates the end of the data transfer;

determining the second packet indicates the end of the data transfer corresponding to the first packet indicating the start of the data transfer;

associating the first packet and the second packet with a flow; and determining data associated with the network or the flow based on the first packet and the second packet, wherein data packets received by the network device that do not indicate a start or an end of a data transfer are not captured.

2. The network device of claim 1, wherein the one or more processors are further configured for:

determining, before capturing the first packet, that a first packet sequence number of the first packet is within a range of packet sequence numbers; and determining, before capturing the second packet, that a second packet sequence number of the second packet is within the range of packet sequence numbers.

3. The network device of claim 2, wherein determining the first packet sequence number and the second packet number are within the range is based on matching a set of bits of the first packet sequence number and the second packet sequence number.

4. The network device of claim 3, wherein the set of bits are a set of middle bits or a set of most significant bits.

5. The network device of claim 2, wherein the determination that the second packet is the write last packet corresponding to the first packet is made based on a first packet sequence number of the first packet and a second packet sequence number of the second packet or on a message size associated with the first packet.

6. The network device of claim 1, wherein the first packet is a write first packet and the second packet is a write last packet.

7. The network device of claim 6, wherein the determination that the first packet is a write first packet is made based on a first opcode of the first packet and the determination that the second packet is a write last packet is made based on a second opcode of the second packet.

8. The network device of claim 6, wherein the flow is determined based on a source IP address, a destination IP address, and a destination queue pair (QP) associated with the first packet and second packet.

9. The network device of claim 6, wherein the one or more processors are further configured for:

determining a first latency associated with the first packet;

determining second latency associated with the second packet; and determining network data associated with the network and the first data write based on a comparison of the first latency and the second latency.

10. The network device of claim 6, wherein the one or more processors are further configured for:

receiving a third packet communicated from the first host to the second host over the network;

determining the third packet is a write first packet;

capturing the third packet based on the determination the third packet is the write first packet associated with a second data write;

receiving a fourth packet;

determining the fourth packet is a write last packet;

capturing the fourth packet based on the determination the fourth packet is a write last packet;

determining the fourth packet corresponds to the second data write associated with the third packet;

determining the third packet and the fourth packet are associated with the flow;

determining the second write is subsequent to the first data write; and determining data associated with the host based on the second packet that is the write last packet for the first write and the third packet which is the write first packet that is the write first packet for the second write.

11. The network device of claim 1, wherein the data transfer is an accelerated data transfer.

12. The network device of claim 1, wherein the flow is associated with a set of data transfers.

13. The network device of claim 1, wherein the data associated with the network or the flow comprises performance characteristics of the network or the flow.

14. The network device of claim 1, wherein the capturing of the first and second packets comprises:

creating a copy of the first and second packets in a buffer maintained in a control plane of the network device; and forwarding the first and second packets onward towards the second host.

15. A method performed by a network device for monitoring a network, comprising:

receiving a set of packets communicated from a first host to a second host over the network, wherein the network device is an intermediary network device situated in the network between the first and second hosts, and wherein the set of packets include a first packet;

determining the first packet should be captured based on determination that the first packet is a write first packet or a write last packet;

capturing the first packet at the network device based on the determination the first packet is the write first packet associated with a first data write;

determining a flow associated with the first packet;

when there is an entry associated with the determined flow in network monitoring data, associating the captured first packet with the entry for the flow;

when there is no entry associated with the determined flow in the network monitoring data, creating the entry associated with the determined flow and associating the captured first packet with the created entry for the flow;

when the first packet is a write last packet, determining a second packet associated with the flow where the second packet is the write first packet corresponding to the first packet and associating the first packet with the second packet in the network monitoring data; and determining data associated with the network or the flow based on the first packet or the second packet, wherein packets in the set of packets that are neither the write first packet or the write last packet are not captured.

16. The method of claim 15, wherein the flow comprises a source IP address, a destination address, and a QP.

17. The method of claim 15, wherein the determination that the first packet should be captured is based on a packet sequence number associated with the first packet.

18. The method of claim 15, further comprising associating the flow with one or more other flows to determine a collective including the flow, wherein the network data includes network data associated with the collective.

19. A non-transitory computer readable medium, comprising instructions executable by a network device for:

obtaining a captured first ROCE packet associated with a data write, wherein the first ROCE packet was captured from a set of packets at the network device based on a determination that the first ROCE packet is a write first packet;

obtaining a captured second ROCE packet, wherein the second ROCE packet was captured from the set of packets at the network device based on a determination that the second ROCE packet is a write last packet;

determining the second ROCE packet is the write last packet corresponding to the first ROCE packet that is the write first packet associated with the data write;

associating the first ROCE packet and the second ROCE packet with a flow; and determining network data associated with the network or the flow based on the first ROCE packet and the second ROCE packet, wherein the set of packets are communicated from a first host to a second host over the network, and wherein the network device is an intermediary network device situated in the network between the first and second hosts, wherein packets in the set of packets that are neither the write first packet or the write last packet are not captured.

20. The non-transitory computer readable medium of claim 19, wherein the first ROCE packet and the second ROCE packet were captured by a data plane of the network device.

21. The non-transitory computer readable medium of claim 20, wherein the first ROCE packet and the second ROCE packet were captured by matching an opcode in the data plane or by matching a packet sequence number in the data plane.

* * * * *